US010713952B2

(12) United States Patent
Ogawa et al.

(10) Patent No.: US 10,713,952 B2
(45) Date of Patent: Jul. 14, 2020

(54) ROAD INFORMATION RECOGNITION SYSTEM AND ROAD INFORMATION RECOGNITION METHOD (71) Applicant: Hitachi Automotive Systems, Ltd., Hitachinaka-shi, Ibaraki (JP)

(72) Inventors: Takashi Ogawa, Tokyo (JP); Takashi Okada, Hitachinaka (JP); Isao Ochi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/071,447

(22) PCT Filed: Jan. 10, 2017

(86) PCT No.: PCT/JP2017/000369
§ 371 (c)(1),
(2) Date: Jul. 19, 2018

(87) PCT Pub. No.: WO2017/130671
PCT Pub. Date: Aug. 3, 2017

(65) Prior Publication Data
US 2019/0027040 A1 Jan. 24, 2019

(30) Foreign Application Priority Data
Jan. 28, 2016 (JP) ................................. 2016-014493

(51) Int. Cl.
*G08G 1/16* (2006.01)
*G06T 7/60* (2017.01)
(Continued)

(52) U.S. Cl.
CPC ............. *G08G 1/167* (2013.01); *B60R 21/00* (2013.01); *B60W 40/06* (2013.01);
(Continued)

(58) Field of Classification Search
None
See application file for complete search history.

(56) References Cited

U.S. PATENT DOCUMENTS 7,274,311 B1 * 9/2007 MacLeod ................ G06T 13/00
340/995.13
2005/0195095 A1 * 9/2005 Kato ....................... G08G 1/143
340/932.2
(Continued)

FOREIGN PATENT DOCUMENTS

DE 102009027026 A1 * 12/2010 ........... B62D 15/029
JP 5-342500 A 12/1993
(Continued)

OTHER PUBLICATIONS

Google Patent Translated German Patent Pub. No. 102009027026A1 to Bersiner et al. that published in 2010 (hereinafter "Bersiner") (downloaded Jun. 27, 2019).*
(Continued)

Primary Examiner — Jean Paul Cass
(74) Attorney, Agent, or Firm — Crowell & Moring LLP (57) ABSTRACT The present invention is directed to a novel road information recognition system capable of highly accurately estimating the positions of lane markers to be located on the far side of a lane after change of lane. The present invention is equipped with a front lane marker detection means for detecting, by using a front imaging means, lane markers located ahead of a host vehicle; a side lane marker detection means for detecting, by using a side imaging means, the positions of lane marker located on both sides of the vehicle and a lane width; and a front lane marker estimation means for estimating the positions of the lane markers to be located on the far side of the lane after change of lane on the basis of the information regarding the lane markers located ahead of the vehicle, which is obtained by the front lane marker (Continued)

detection means, and the positions of the lane markers located on the sides of the vehicle and the lane width, which are obtained by the side lane marker detection means.

6 Claims, 8 Drawing Sheets

(51) Int. Cl.
    *B60R 21/00*   (2006.01)
    *B60W 40/06*   (2012.01)
    *G08G 1/0962*  (2006.01)
    *G06K 9/62*    (2006.01)
    *G06K 9/00*    (2006.01)

(52) U.S. Cl.
    CPC ....... *G06K 9/00798* (2013.01); *G06K 9/6292* (2013.01); *G06T 7/60* (2013.01); *G08G 1/0962* (2013.01); *G08G 1/16* (2013.01)

(56) References Cited

U.S. PATENT DOCUMENTS

| | | | |
|---|---|---|---|
| 2005/0228587 A1 | 10/2005 | Kobayashi et al. | |
| 2005/0232469 A1* | 10/2005 | Schofield | G06K 9/00818 382/104 |
| 2008/0040039 A1 | 2/2008 | Takagi | |
| 2012/0130595 A1* | 5/2012 | Hayakawa | B60W 30/12 701/42 |
| 2014/0222286 A1* | 8/2014 | Chundrlik, Jr. | B60W 50/0098 701/36 |
| 2015/0151725 A1* | 6/2015 | Clarke | G06T 7/70 701/28 |
| 2016/0314358 A1* | 10/2016 | Kushida | G06K 9/00798 |
| 2017/0123430 A1* | 5/2017 | Nath | G05D 1/0223 |
| 2017/0313297 A1* | 11/2017 | Okada | G08G 1/16 |
| 2018/0253609 A1* | 9/2018 | Potter | G06K 9/00791 |

FOREIGN PATENT DOCUMENTS

| | | |
|---|---|---|
| JP | 11-167636 A | 6/1999 |
| JP | 2005-301603 A | 10/2005 |
| JP | 2007-310595 A | 11/2007 |
| JP | 2013-242670 A | 12/2013 |
| WO | WO 2017/002612 A1 | 1/2017 |

OTHER PUBLICATIONS

International Search Report (PCT/ISA/210) issued in PCT Application No. PCT/JP2017/000369 dated Feb. 28, 2017 with English translation (four (4) pages).

Japanese-language Written Opinion (PCT/ISA/237) issued in PCT Application No. PCT/JP2017/000369 dated Feb. 28, 2017 (three (3) pages).

Extended European Search Report issued in counterpart European Application No. 17743902.3 dated Sep. 5, 2019 (nine (9) pages).

Cheng et al., "Lane Detection with Moving Vehicles in the Traffic Scenes," IEEE Transactions on Intelligent Transportation Systems, Dec. 1, 2006, pp. 571-582, vol. 7, No. 4, Piscataway, NJ, USA, XP011151302 (12 pages).

Jung et al., "Efficient Lane Detection Based on Spatiotemporal Images," IEEE Transactions on Intelligent Transportation Systems, Jan. 1, 2016, pp. 289-295, vol. 17, No. 1, Piscataway, NJ, USA, XP011595322 (seven (7) pages).

\* cited by examiner

ROAD INFORMATION RECOGNITION SYSTEM AND ROAD INFORMATION RECOGNITION METHOD

TECHNICAL FIELD

The present invention relates to a road information recognition system for estimating lane marker information on a road and a road information recognition method for estimating lane marker information.

BACKGROUND ART

Recently, researches for mounting, on automobiles, (hereinafter, referred to as vehicles) an automatic driving system which travels on a preset or estimated traveling route while avoiding collision with other moving bodies and obstacles in the vicinity of the automobiles or a driving support system which supports driver's driving operation have been promoted.

Such automatic driving system and driving support system use an external recognition sensor mounted on a vehicle to recognize moving bodies and obstacles such as other vehicles existing in the vicinity of a host vehicle, lane marks which partition lanes on a road on which a host vehicle travels, a road mark, and the like, and performs automatic driving and driving support of the host vehicle based on these surrounding environment information.

As a function example of the automatic driving or driving support, there is a lane change function of changing from a traveling lane on which the host vehicle is traveling to any one of left and right adjacent lanes. For example, in the lane change function in the automatic driving system, the lane to be driven is automatically changed based on a lane change request from a driver or a lane change request determined on the automatic driving system.

In addition, in the lane change function in the driving support system, when a driver performs the lane change operation, there is a function of determining that safety such as whether there is a possibility that the host vehicle collides with the surrounding moving bodies due to the lane change can be secured and providing the determination information to the driver.

In such lane change function, target marker information (traveling direction line) to be followed up by a vehicle is generated based on lane marker information (also referred to as lane mark information and lane marker information) which defines (partitions) the lanes. Therefore, it is important to obtain not only lane marker information of a lane on which a vehicle is currently traveling (hereinafter, referred to as a lane before change of lane) but also lane marker information of a lane on which a vehicle is traveling after a lane is changed (hereinafter, referred to as a lane after change of lane). Here, a white line (lane mark) or the like drawn on a road is known for partitioning a lane, and the lane marker information is generated by recognizing this white line by the external recognition sensor.

However, with only a front camera photographing a front of a vehicle, the lane marker located on a far side of a lane after change of lane (definition will be described later) as viewed from the lane before change of lane is not in a visual field of the front camera sufficiently, such that it is difficult to obtain the accurate lane marker information. In addition, when another vehicle is traveling on the lane after change of lane, the lane marker may be shielded by the other vehicle. As a result, it becomes difficult to obtain the lane marker information on the far side of the lane after change of lane.

Here, the far side or the near side of the lane marker means the following. The lane after change of lane adjacent to the lane before change of lane on which a vehicle is currently traveling is formed by a lane marker which is common to the lane before change of lane and the lane after change of lane and by an outside lane marker which is paired with this common lane marker and partitions the lane after change of lane. Therefore, when viewed from the host vehicle, the lane marker which is common to the lane before change of lane and the lane after change of lane becomes a lane marker on near side and the outside lane marker which forms the lane after change of lane becomes a lane marker on far side. For example, if the traveling vehicle changes to a right lane, a left lane marker of the lane after change of lane becomes a lane marker on near side and a right lane marker of the lane after change of lane becomes a lane marker on far side.

In order to solve such problem, JP 11-167636 A (PTL 1) discloses a method for mounting a side camera for photographing the side of the vehicle to estimate a position of a lane marker of a lane on which a host vehicle travels. In PTL 1, the front camera photographing the front of the vehicle and the side camera photographing the side just under the vehicle are mounted, and the lane marker information by the front camera and the lane marker information by the side camera are combined, thereby estimating the lane marker information of the lane on which the host vehicle is traveling.

CITATION LIST

Patent Literature

PTL 1: JP 11-167636 A

SUMMARY OF INVENTION

Technical Problem

In PTL 1, by photographing the side just under the vehicle in addition to photographing the front of the vehicle, the position of the lane marker of the lane on which the host vehicle is traveling is estimated. However, no consideration is given to estimating the position of the lane marker to be located on the far side of the lane on which the vehicle is traveling after changing the lane.

An object of the present invention is to provide a novel road information recognition system and road information recognition method capable of highly accurately estimating a lane marker to be located on a far side of a lane after change of lane.

Solution to Problem

The feature of the present invention is to, by imaging surroundings of a vehicle, detect a lane marker of a lane after change of lane to which the vehicle changes a lane and a lane width of the lane after change of lane, and estimate a lane marker to be located on a far side of the lane after change of lane by reflecting the lane width of the lane after change of lane on a lane marker located on a near side of the lane after change of lane to which the vehicle changes a lane, which is detected by imaging a front of the vehicle.

Advantageous Effects of Invention

According to the present invention, it is possible to estimate the lane marker to be located on the far side of the lane after change of lane based on the known lane marker located on the near side of the lane after change of lane and the lane width of the lane after change of lane. As a result, it is possible to improve the detection accuracy of the lane marker at the time of changing a lane and to improve the reliability of the road information recognition system.

DESCRIPTION OF EMBODIMENTS

Hereinafter, embodiments of the present invention will now be described in detail with reference to the drawings, but the Present invention is not limited to the following embodiments, and various modified examples and application examples within the technical concept of the present invention are included within the scope of the present invention.

Figure 1:
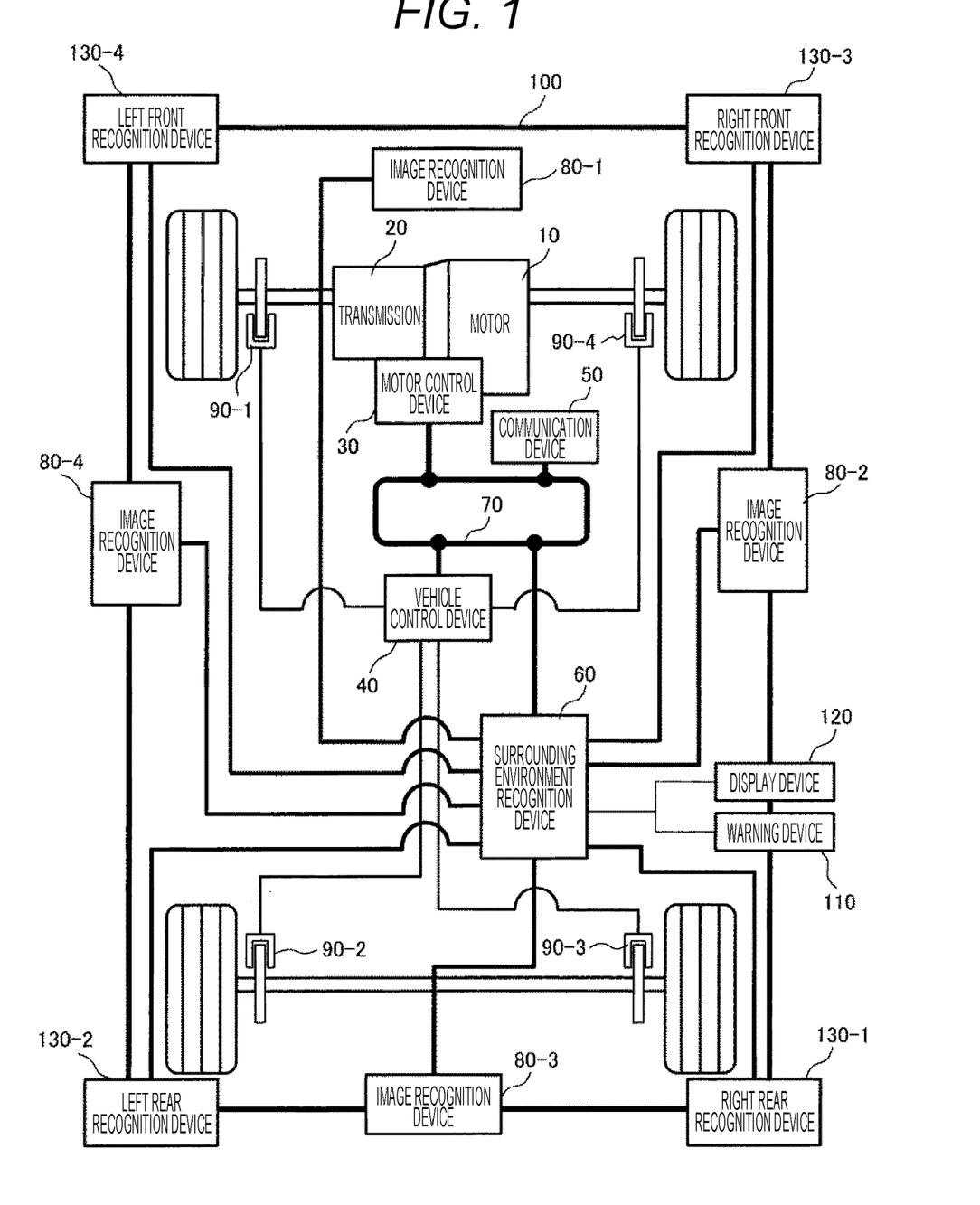
FIG. 1 is a configuration diagram showing the overall configuration of a vehicle equipped with a road information recognition system.

FIG. 1 shows a vehicle in which a surrounding environment recognition device 60 of the present invention which recognizes a moving body or road environment is mounted on a vehicle system which recognizes the surrounding environment of a host vehicle 100 to support driving of the host vehicle or performs an automatic driving control of the host vehicle, and shows an outline of the entire vehicle system.

In FIG. 1, the vehicle 100 equipped with the surrounding environment recognition device 60 has an upper side as a front side and a rear side as a lower side, and includes a motor 10 which drives the vehicle 100, a transmission 20 which transmits power of the motor 10, and a motor control device 30 which controls the motor 10, thereby driving the vehicle 100. Although FIG. 1 shows an example in which the motor 10 and the transmission 20 are mounted on the front side to drive tires on the front side, the tires on the rear side may be driven or all of four wheels may be driven.

The vehicle 100 is equipped with a vehicle control device 40 which controls braking devices 90-1, 90-2, 90-3, 90-4 and the like installed on the tires on the four wheels of the vehicle 100, a plurality of control devices such as a communication device 50 which performs communication with the outside, in addition to the motor control device 30 which controls the motor 10 and the transmission 20, all of which are connected to a control network 70 to communicate information with each other. The vehicle control device 40 includes many vehicle control functions in addition to the braking devices.

In the embodiment shown in FIG. 1, the surrounding environment recognition device 60 is mounted on the vehicle 100, receives external information acquired by image recognition devices 80-1, 80-2, 80-3, and 80-4 which acquire external information around the vehicle 100 and by a right rear recognition device 130-1, a left rear recognition device 130-2, a right front recognition device 130-3, and a left front recognition device 130-4 and information regarding vehicle state quantities (speed, yaw rate, yaw angle, longitudinal acceleration, lateral acceleration, steering angle, and the like) indicative of the state of the vehicle 100, and recognizes the external information around the host vehicle 100. In accordance with the information, the vehicle control device 40 controls the entire vehicle. The vehicle state quantities indicative of the state of the vehicle 100 is detected by a yaw rate sensor, an acceleration sensor, a speed sensor, a steering angle sensor, and the like which are not shown in FIG. 1.

The communication device 50 is a device which exchanges communication from the outside. For example, if road surface information (road surface paint types and positions and the like such as a position of a lane marker, a position of a stop line, and a pedestrian crossing) and three-dimensional object information (three-dimensional objects existing around a road such as a sign, a traffic light, and a feature) are provided as nearby road information while a vehicle is traveling, the communication device 50 can acquire the information.

The communication device 50 can also acquire such information which includes information detected by a sensor installed in a road infrastructure or the like, road surrounding information (road surface information, three-dimensional object information and the like) stored in a data center, and road surrounding information (road surface information, three-dimensional object information and the like) detected by other vehicles.

The image recognition devices 80-1, 80-2, 80-3, and 80-4 are devices which acquire the external information around the vehicle 100, and as a specific example, image recognition by a camera can be used. Examples of the camera may include a monocular camera which recognizes the external world with a single camera, a stereo camera which recognizes the external world with two cameras, and the like. In the image recognition by the camera, it is possible to simultaneously recognize a plurality of moving bodies moving around the host vehicle 100 such as other vehicles, pedestrians, light vehicles (bicycles and the like) as the external information of the host vehicle 100, and also classify characteristics of the moving bodies.

In addition, it is possible to detect relative distances of moving bodies and obstacles existing around the host vehicle 100 by using the stereo camera. In addition, in the image recognition by the camera, it is possible to acquire information, such as the position and the size or the shape of the lane marker (white line), the position of the stop line, and the position of the pedestrian crossing, as the road surface information drawn on a road. In addition, it is possible to acquire information of the type, the size, the position of the sign existing on the side of the road, information of the size and position of the traffic light, and other specific information of the position of the specific three-dimensional feature, as the three-dimensional object.

The right rear recognition device 130-1, the left rear recognition device 130-2, the right front recognition device 130-3, and the left front recognition device 130-4 detect three-dimensional objects or obstacles existing on the right rear, left rear, right front, left front of the vehicle 100, respectively In particular, it is possible to detect the three-dimensional objects all around the host vehicle 100 by detecting the relative position and the relative speed of the three-dimensional objects such as the moving bodies or the obstacles in the region which cannot be detected only by the image recognition devices 80-1, 80-2, 80-3, and 80-4.

A warning device 110 and a display device 120 display the surrounding environment information of the host vehicle 100 recognized by the surrounding environment recognition device 60 to notify a driver of the surrounding environment. Alternatively, the warning device 110 and the display device 120 notify or warn and display a notice or the like of collision information which is determined by the surrounding environment recognition device 60 based on the information regarding moving bodies and traveling lanes around the host vehicle 100.

Figure 2:
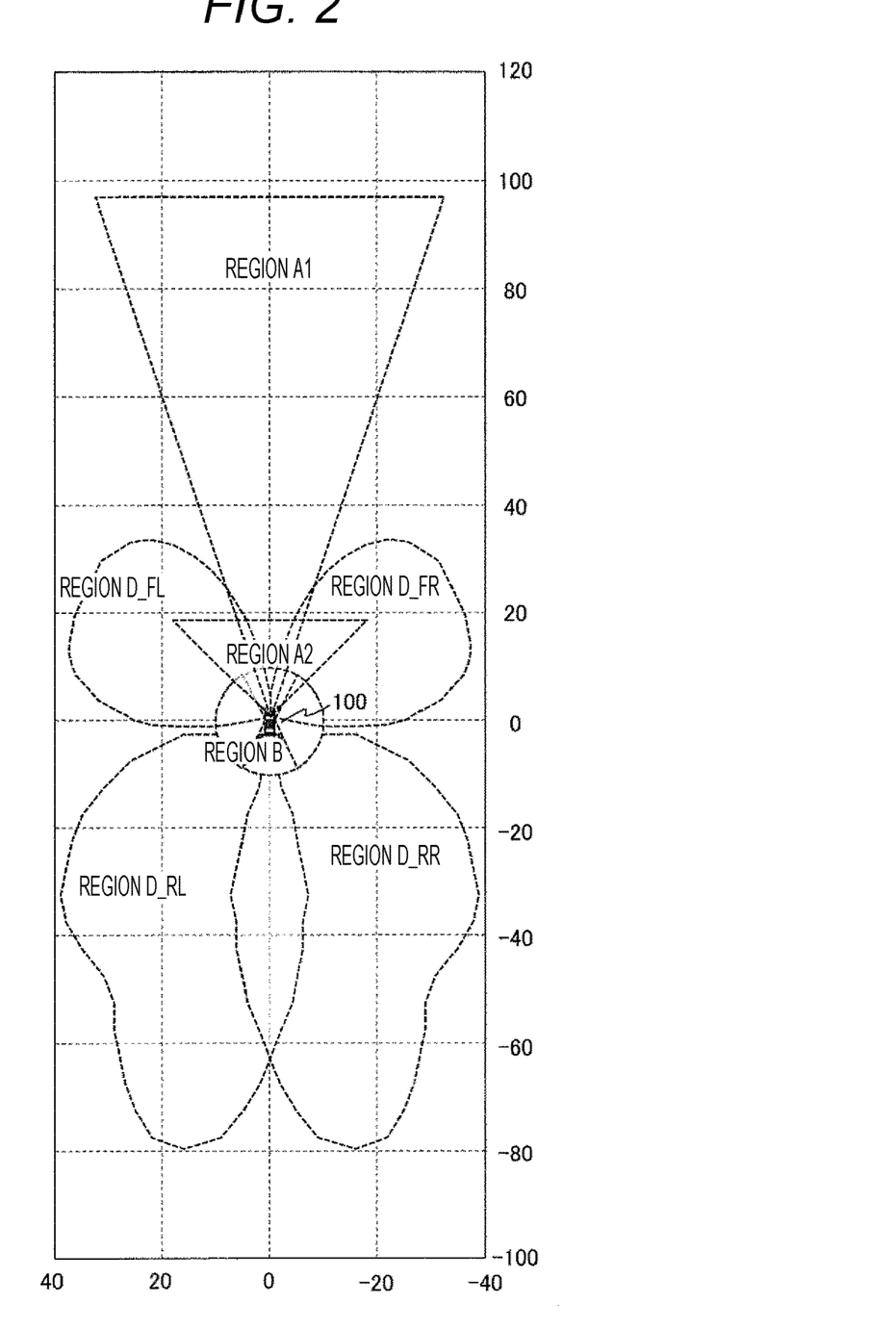
FIG. 2 is an explanatory diagram for explaining a recognition region of surrounding environment of a host vehicle.

FIG. 2 shows an external recognition region by the image recognition devices 80-1, 80-2, 80-3 and 80-4 and the right rear recognition device 130-1, the left rear recognition device 130-2, the right front recognition device 130-3, and the left front recognition device 130-4 mounted on the host vehicle 100. In FIG. 2, the surrounding environment information of a region A1, a region A2, and a region B is detected by using the image recognition device 80 by an imaging means. In the present embodiment, a camera is adopted as the imaging means, and the camera will be described below.

In addition, a radar sensor different from the camera is mounted on the host vehicle 100 as the right rear recognition device 130-1, the left rear recognition device 130-2, the right front recognition device 130-3, and the left front recognition device 130-4, and three-dimensional objects such as moving bodies and obstacles all around the host vehicle 100 are detected by the right rear recognition device 130-1, the left rear recognition device 130-2, the right front recognition device 130-3, and the left front recognition device 130-4.

The radar used as the right rear recognition device 130-1, the left rear recognition device 130-2, the right front recognition device 130-3, and the left front recognition device 130-4 is difficult to identify the moving bodies and the obstacles but can highly accurately detect distances and speeds of the moving bodies and the obstacles.

In the example of FIG. 2, the right rear recognition device 130-1, the left rear recognition device 130-2, the right front recognition device 130-3, and the left front recognition device 130-4 mounted on the host vehicle 100 can detect distances and speeds of the moving bodies and obstacles in a region D_RR, a region D_RL, a region D_FR, and a region D_FL. By adopting such configuration, the camera identifies road surface information or three-dimensional objects around the host vehicle 100, and the radar detects the distances from the three-dimensional objects, thereby more highly accurately detecting the surrounding environment information.

Figure 3A:
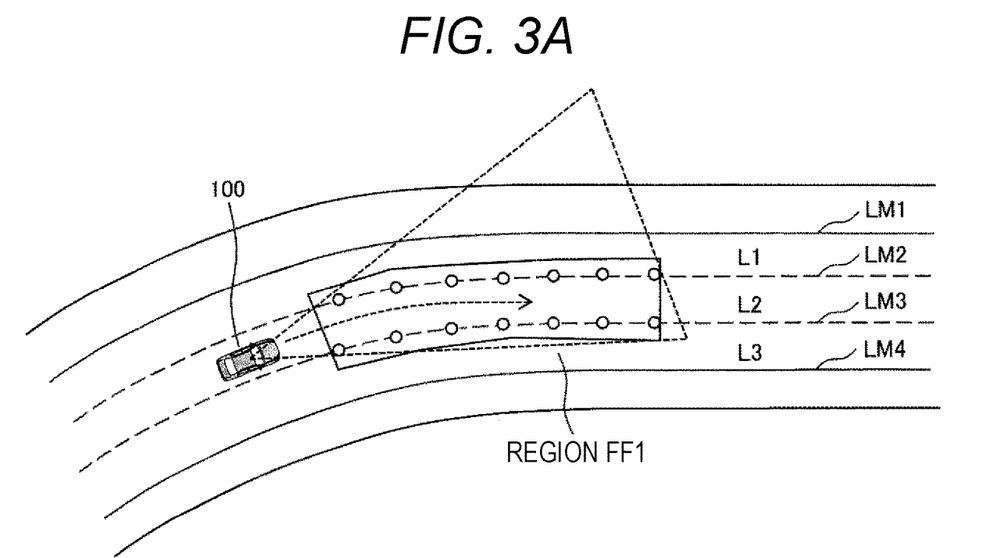
FIG. 3A is an explanatory diagram for explaining a detection situation of a lane marker in a vehicle equipped with a road information recognition system according to the related art.

FIG. 3A shows a conventional detection state of a lane marker in a case in which the host vehicle 100 travels from a left side to a right side of FIG. 3 on a curved road of three lanes in each direction. Here, a lane marker LM1 and a lane marker LM4 are lane markers which partition a roadway and a road shoulder, and a lane marker LM2 and a lane marker LM3 are lane markers which partition lanes.

Therefore, a lane L1 is defined by the lane marker LM1 and the lane marker LM2, a lane L2 is defined by the lane marker LM2 and the lane marker LM3, and a lane L3 is defined by the lane marker LM3 and the lane marker LM4. The lane marker LM2 is a common lane marker of the lane L1 and the lane L2, and the lane marker LM3 is a common lane marker of the lane L2 and the lane L3.

The host vehicle 100 is traveling on the lane L2 which is a central lane of the three lanes, and intends to change a lane to the lane L3 which is a right lane. As viewed from the host vehicle 100, the left side of the lane L1 is the lane marker LM1 and the right side thereof is the lane marker LM2, the left side of the lane L2 is the lane marker LM2 and the right side thereof is the lane marker LM3, and the left side of the lane L3 is the lane marker LM3 and the right side thereof is the lane marker LM4. in this state, as viewed from the lane L2 before change of lane on which the host vehicle 100 is traveling, the lane marker LM3 is a lane marker on near side and the lane marker LM4 is a lane marker on far side.

When the host vehicle 100 changes a lane from a state in which it is traveling on the lane L2 to the right lane L3, the host vehicle 100 performs a lane change operation by determining that the host vehicle does not collide with other vehicles based on a relative distance and a relative speed of a preceding vehicle and a following vehicle which are traveling on the right lane L3 and a speed of the host vehicle, and the like.

Since an automatic driving system or a driving support system is indispensable to accurately figure out situations ahead of the host vehicle 100 which is traveling, as described with respect to the front of the vehicle with reference to FIG. 2, the image recognition device 80-1 can detect road situations or moving bodies up to a far side of the front of the vehicle as shown in at least a region FF1.

With regard to the image recognition device 80-1, it is preferable to use the stereo camera which detects relative positions of three-dimensional objects or road surface markers based on parallax using two cameras. By applying such stereo camera to the image recognition device 80-1, it is possible to detect the moving bodies or the lane markers on a far side of the front of the vehicle. Therefore, in the case of FIG. 3A, the image recognition device 80-1 can reliably detect the positions of the lane marker LM2 and the lane marker LM3.

In the drawing, marks "o" indicate the detected lane markers in a pseudo manner as point sequences. For this reason, if the marks "o" are displayed on the display screen, the lane marker is displayed. In addition, the marks "o" can be displayed by being connected by a line.

For example, when the host vehicle 100 intends to change the lane from the lane L2 to the right lane L3 while traveling on a curved road, the image recognition device 80-1 can detect the lane markers LM2 and LM3 of the lane L2 before change of lane as described above. The image recognition device 80-1 can detect the position information and shape information of the lane markers LM2 and LM3.

However, when considering the lane L3 after change of lane, although it is possible to detect the lane marker on near side, that is, the left lane marker LM3, the right lane marker LM4, which is the lane marker on far side, does not sufficiently enter the visual field of the camera and thus cannot be detected. Further, when there are other vehicles traveling on the lane L3 after change of lane, the lane marker L4 is shielded by other vehicles and thus cannot be detected.

At this time, since target marker information (traveling direction line) to be followed up by the host vehicle is generated based on the lane marker information of the lane before change of lane and the lane marker information of the lane after change of lane, when the target marker information (traveling direction line) is generated at the time of changing a lane, the lane marker information of the lane before change of lane and the lane marker information of the lane after change of lane are required.

Figure 3B:
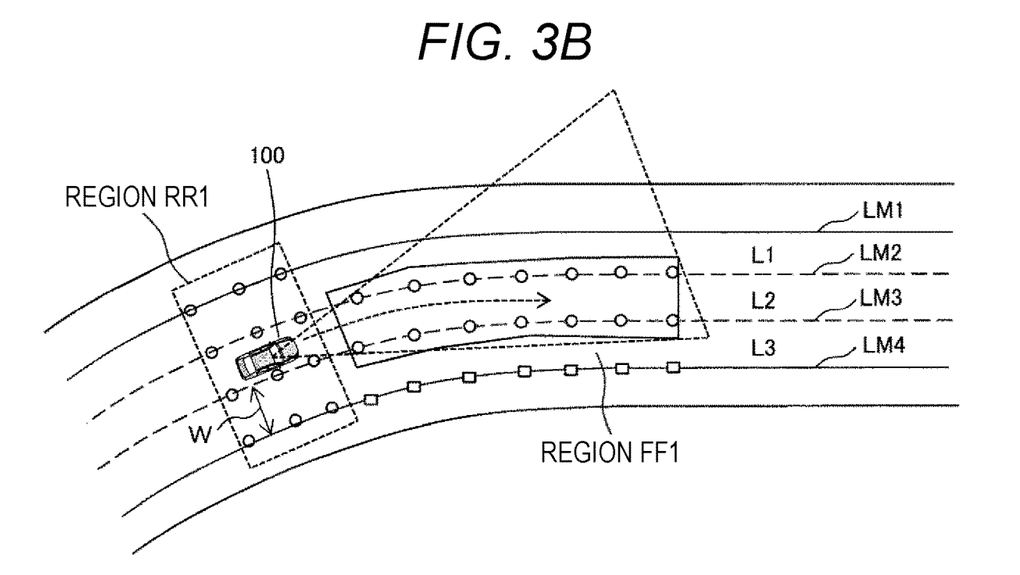
FIG. 3B is an explanatory diagram for explaining a detection situation of a lane marker in a vehicle equipped with a road information recognition system according to an embodiment.

In order to cope with this, the following method is adopted in the present embodiment, and the detection state of the lane marker is shown in FIG. 3B.

As described with reference to FIG. 1, by using the image recognition device 80-2 which recognizes an external world on the right side of the host vehicle 100 and the image recognition device 80-4 which recognizes an external world on the left side of the host vehicle 100, as shown in a region RR1, it is possible to detect the lane markers LM2 and LM3 of the lane L2 on which the host vehicle 100 is traveling, the lane markers LM1 and LM2 of the left lane L1, and the lane markers LM3 and LM4 of the right lane L3. The marks "○" indicate detected lane markers. The image recognition device 80-2 and the image recognition device 80-4 can detect the position information or the shape information of the lane markers LM1 to LM4.

For example, when the host vehicle 100 is permitted to change a lane from the lane L2 to the lane L3, there are no other vehicles or obstacles in the vicinity of the host vehicle 100 on the lane L3 after change of lane in this state. Therefore, since the existence of the lane marker LM4 can be confirmed by using the image recognition device 80-2, it is possible to detect the far side of the lane L3 after change of lane, that is, the existence of the right lane marker LM4 and the lane width W of the lane L3 after change of lane, in the vicinity of the host vehicle 100.

Therefore, by combining the information of the lane marker LM3 detected by the image recognition device 80-1 with the information of the lane width W of the lane L3 after change of lane detected by the image recognition device 80-2, it is possible to estimate the lane marker information of the region portion (=region portion where the information of the lane marker LM3 exists) existing ahead of the host vehicle 100 in the lane marker LM4 to be located on the far side of the lane L3 after change of lane.

That is, in the range where the lane marker LM3 is detected, position coordinates obtained by adding the lane width W of the lane L3 after change of lane to position coordinates of the lane marker LM3 are regarded as the lane marker LM4 of the lane L3 after change of lane. The estimated lane marker LM4 to be located on the far side of the lane L3 after change of lane is indicated by marks "□", the lane marker information is output as point sequence data of position coordinates represented by the coordinate system of the host vehicle 100, and if the marks "□" are displayed on the display screen, a lane marker is displayed. Even in this case, the marks "□" can be displayed by being connected by a line.

Figure 8:
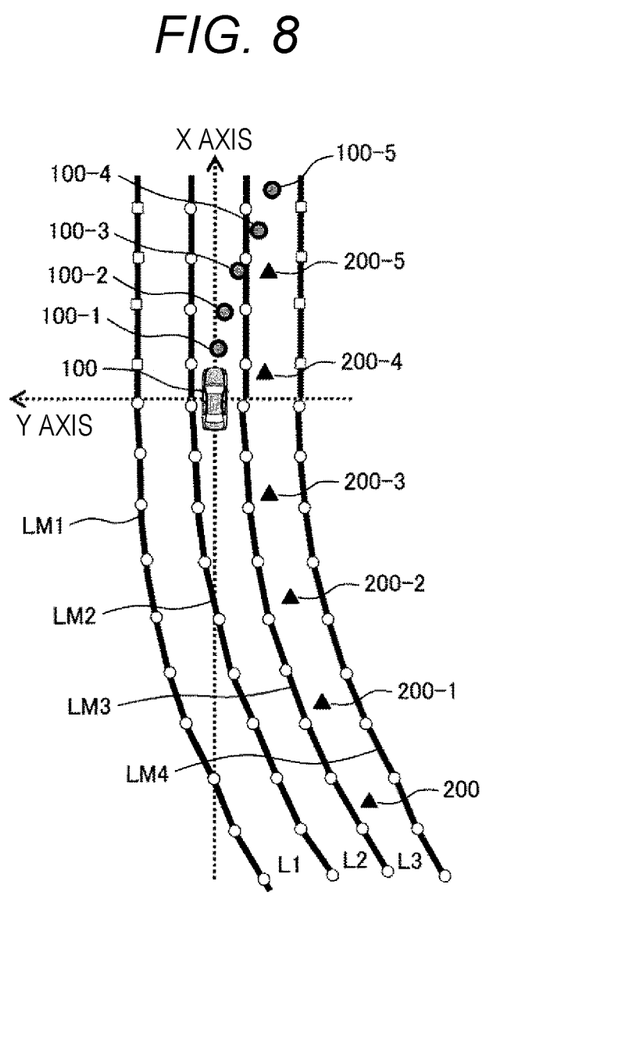
FIG. 8 is an explanatory diagram of a display screen in a case of determining whether the lane change control is possible using the road information recognition system of the present invention.

In addition, the target marker information (traveling direction line) to be followed up by the host vehicle is generated based on the lane marker information of the lane before change of lane and the lane marker information of the lane after change of lane. For example, as shown in FIG. 8, the target marker information (traveling direction line) can be represented by point sequences 100-1, 100-2, 100-3, 100-4, and 100-5 on the lane ahead of the host vehicle 100 toward the target traveling direction in which the host vehicle 100 travels when changing the lane.

Based on this concept as well, the configuration of the surrounding environment recognition device 60 of the present embodiment will be described with reference to FIG. 4.

Figure 4:
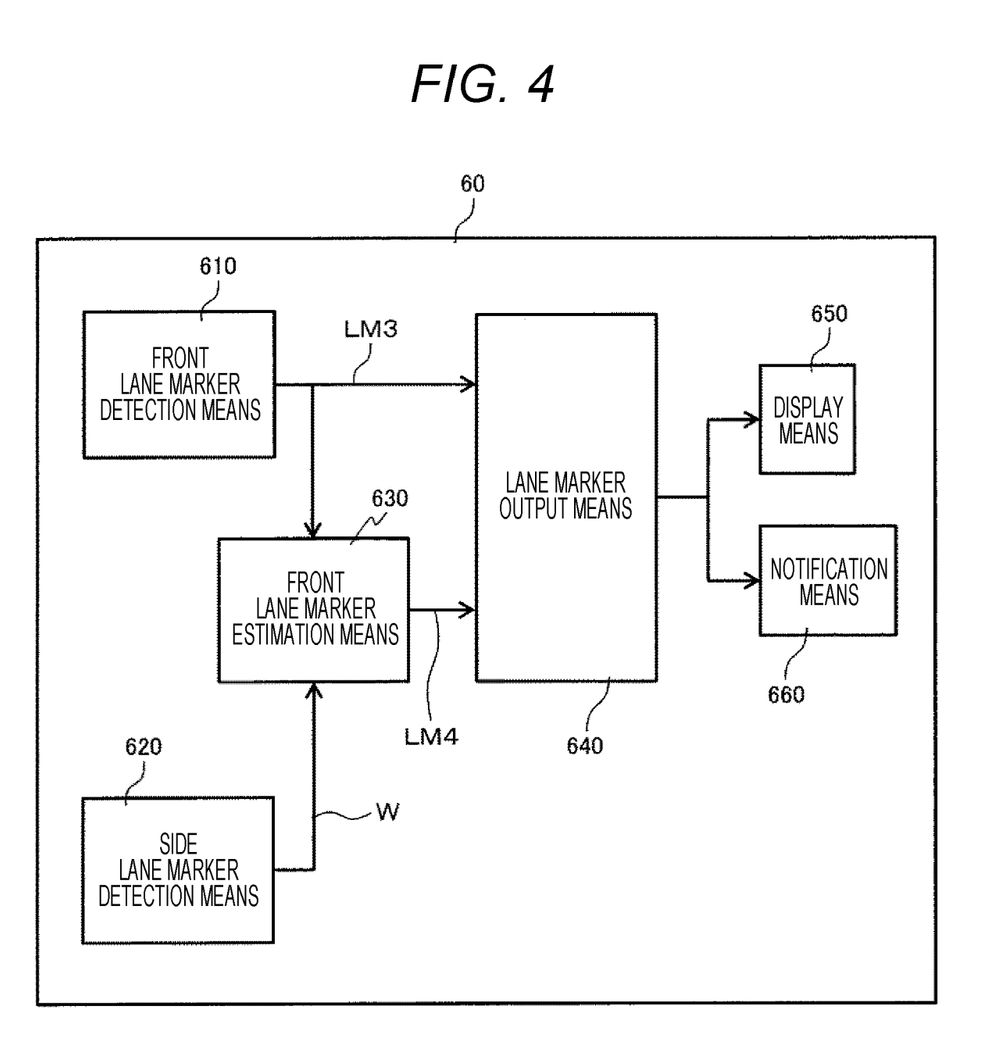
FIG. 4 is a block diagram showing a configuration of a road information recognition system according to an embodiment of the present invention.

FIG. 4 shows an example of a concrete configuration of the surrounding environment recognition device 60 shown in FIG. 1.

In the surrounding environment recognition device 60, the situations of the surrounding environment of the host vehicle 100 is output based on the information regarding the surrounding environment of the host vehicle 100 detected by the image recognition devices 80-1 to 80-4 and the information regarding the surrounding moving bodies of the host vehicle 100 detected by the right rear recognition device 130-1, the left rear recognition device 130-2, the right front recognition device 130-3, and the left front recognition device 130-4.

In the embodiment of FIG. 4, the surrounding environment recognition device 60 includes a front lane marker detection means 610, a side lane marker detection means 620, a front lane marker estimation means 630, a lane marker output means 640, a display means 650 (display means 120 in FIG. 1), and a notification means 660 (warning device 110 in FIG. 1).

In FIG. 3B, the front lane marker detection means 610 detects the position point sequence data of the lane markers LM2 and LM3 ahead of the host vehicle 100 acquired by the image recognition device 80-1. On the other hand, the side lane marker detection means 620 detects position point sequence data of the lane markers LM1 to LM4 in the vicinity of the host vehicle 100 acquired by the image recognition devices 80-2 and 80-4 and the lane width W of the lane L3 after change of lane.

The front lane marker estimation means 630 outputs the position point sequence data ahead of the estimated lane marker LM4 based on the data of the lane width W between the lane marker LM3 and the lane marker LM4 forming the lane L3 after change of lane output from the side lane marker detection means 620 and the position point sequence data of the front lane marker LM3 of the host vehicle 100 output from the front lane marker detection means 610.

The lane marker output means 640 outputs the position point sequence data of the front lane markers LM2 and LM3 output from the front lane marker detection means 610 and the position point sequence data of the estimated front lane marker LM4 output from the front lane marker estimation means 630.

The position point sequence data of the lane marker output from the lane marker output means 640 are transmitted to the display means 650 and the notification means 660. The display means 650 displays the position of the host vehicle and the lane marker on the screen, so that a driver easily performs a display. In addition, if there is a possibility of collision with other vehicles by the information of the lane marker output means 640, the notification means 660 notifies the driver of this information.

Here, in the example shown in FIG. 3B, since the host vehicle 100 changes a lane to the right side, the right lane marker LM4 is estimated based on the right lane change information, but like the case of changing a lane to the left side, in this case, the front of the lane marker LM1 is estimated by the lane width between the lane marker LM1 and the lane marker LM2 and the lane marker LM2.

In addition, it is possible to estimate the front of the lane marker LM1 and the front of the lane marker LM4 based on the lane width between the lane marker LM1 and the lane marker LM2, the lane width between the lane marker LM3 and the lane marker LM4, the lane marker LM2, and the lane marker LM3, regardless of the lane change direction. In this case, all the lane markers LM1 to M4 are obtained. Of course, when being displayed, the detected lane markers LM2 and LM3 and the estimated lane markers LM1 and LM4 are displayed.

Further, in the above-described embodiment, the lane markers which partition lanes are obtained and displayed, but it is also possible to obtain a center line indicating substantially the middle of the lane, not the lane markers. In this case, the lane width of a pair of lane markers which partition the detected or estimated lanes is set to be ½, and is obtained by adding to or subtracting from the position information (position coordinates) of either one of the lane markers.

In addition, the information to be output to the display means 650 and the notification means 660 may be position point sequence data of a virtual center line of the lane before change of lane and the lane after change of lane instead of the position point sequence data of the lane markers. Also, at the time of changing a lane, the target marker information (traveling direction line) can be generated to smoothly connect the respective virtual center lines of the lane before change of lane and the lane after change of lane described above.

In the embodiments shown in FIGS. 1 and 4, the lane markers are detected using the image recognition device, but the lane markers may be detected by the laser sensor or the like based on the difference in reflectance of the road surface and the lane marker.

Next, the embodiment in which the estimated lane marker information is displayed on the display screen will be described with reference to FIGS. 5 and 6. In this example, all the lane markers LM1 to M4 are displayed.

Figure 5:
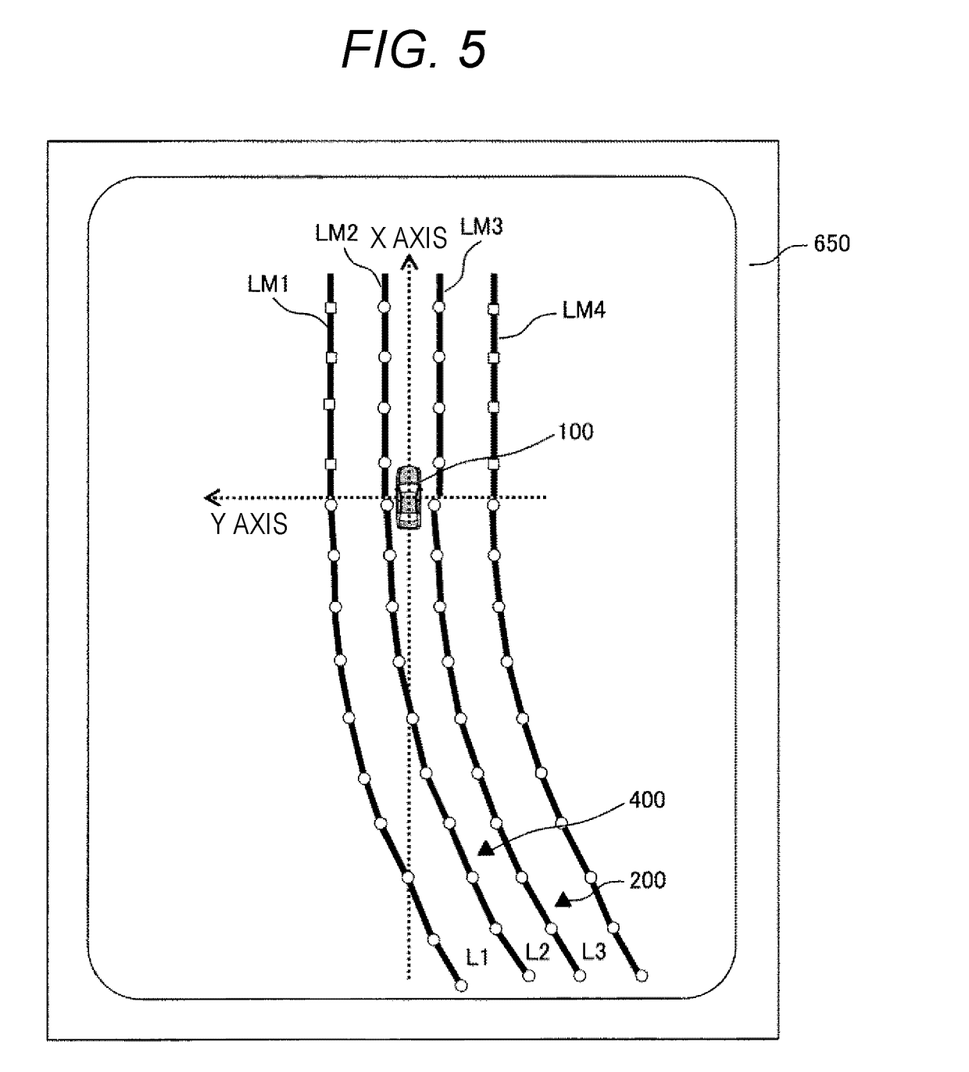
FIG. 5 is an explanatory diagram of a first display screen displaying an estimated lane marker in the road information recognition system of the present invention.

FIG. 5 shows a state in which the position of the host vehicle 100 on the screen of the display device 650 is set as an origin point, the traveling direction of the host vehicle 100 is set to be positive of an X-axis coordinate, and a horizontal direction which is perpendicular to the X-axis coordinate and in which the left side of the host vehicle 100 is positive is represented by a Y-axis coordinate.

The position point sequence data of the host vehicle 100 which is going straight and the lane markers LM1, LM2, LM3, and LM4 around the host vehicle 100 are displayed on a screen of a display device 660 by the marks "o" and "☐" and a "solid line". The marks "o" indicate the detected lane markers, and the marks "☐" indicate the estimated lane markers. However, these can be indicated by various marks and symbols depending on the expression manner, and for example, can be indicated by all the same marks or different colors of the marks. Further, not only the position point sequence data but also the line segment may also be displayed.

Further, positions of moving bodies 200 and 400 existing around the host vehicle 100 are also displayed on the display screen. By this display, it is possible to easily confirm on which lane of lanes on which the host vehicle 100 is traveling the moving bodies existing around the host vehicle 100 is. The driver can easily figure out the information obtained by the surrounding environment recognition device 60 by displaying the information obtained by the surrounding environment recognition device 60, thereby giving an effect of giving the driver a sense of security.

Figure 6:
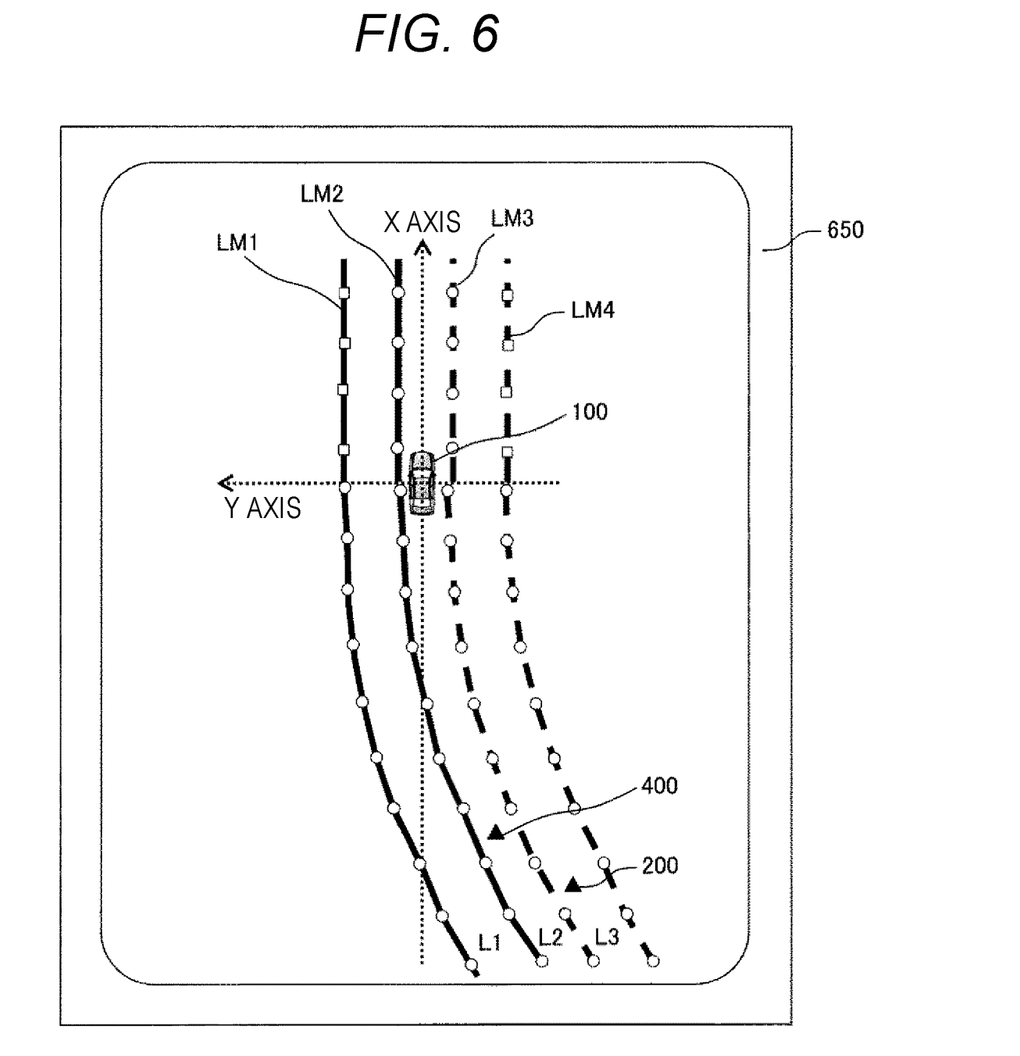
FIG. 6 is an explanatory diagram of a second display screen displaying an estimated lane marker in the road information recognition system of the present invention.

In addition, FIG. 6 shows an example of a display when the image recognition device 80-1 cannot recognize the lane marker LM3 on the right side of the host vehicle 100.

In this case, for example, it is also possible to estimate the right lane markers LM3 and LM4 based on the position point sequence data of the lane markers LM1 and LM2 on the left side of the host vehicle 100 and the lane width value between the lane markers LM1 and LM2.

However, unlike the example shown in FIG. 5, since the reliability of the position point sequence data of the right lane markers LM3 and LM4 is low, differently from the display of the position point sequence data of the left lane marker, the position point sequence data of the right lane markers LM3 and LM4 are represented by the marks "o" and "☐" and a "dashed line". By doing so, the driver can recognize that the right lane markers LM3 and LM4 are somewhat unreliable. Further, it is possible to display on the display screen that the reliability of the position sequence data of the right lane markers LM3 and LM4 is poor, and it is also possible to notify this situation by voice by the notification means 660.

Figure 7:
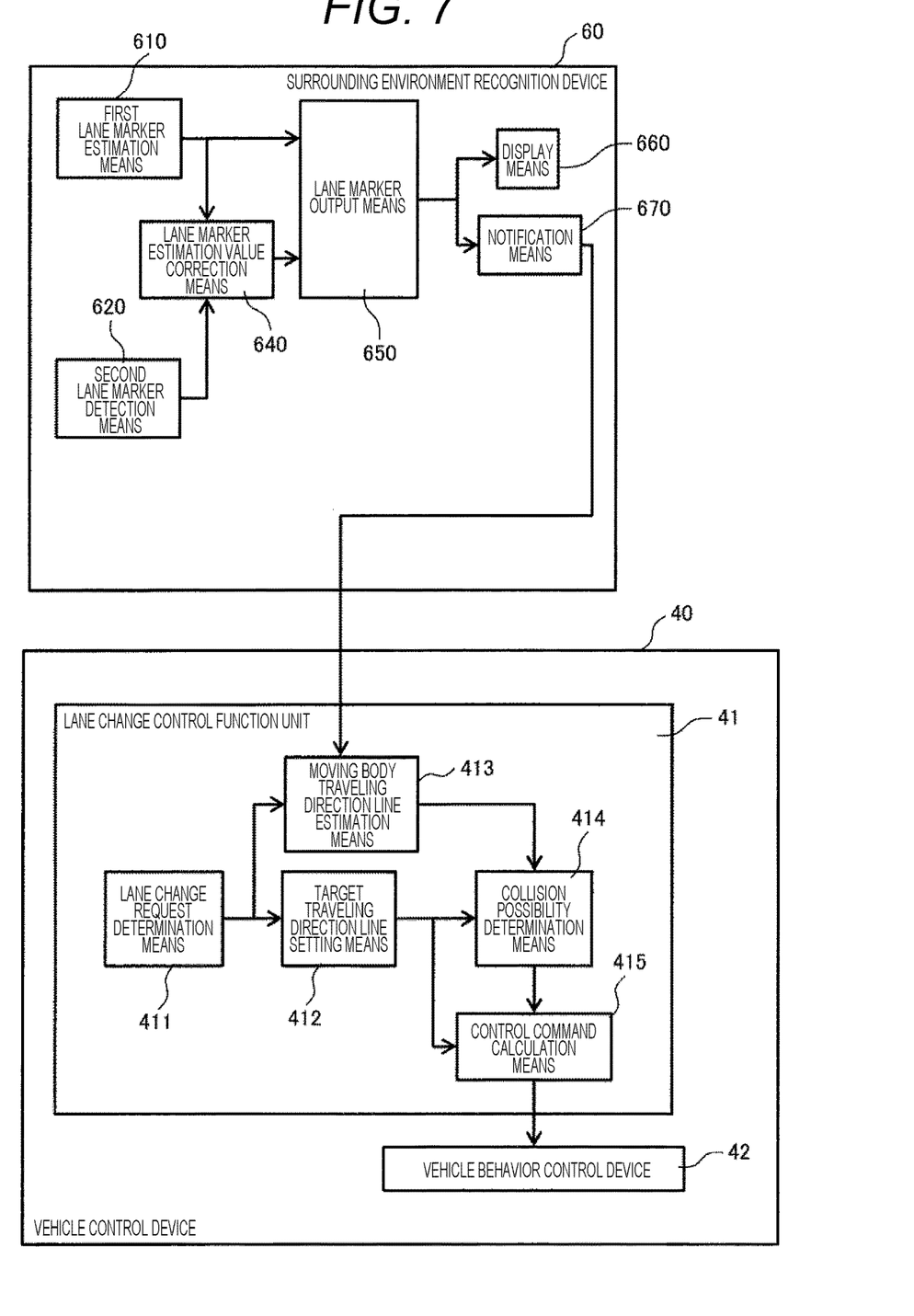
FIG. 7 is a configuration diagram showing a configuration of a vehicle control device which performs a lane change control using the road information recognition system of the present invention.

FIG. 7 shows an embodiment of the lane change control which is performed by a cooperation of the surrounding environment recognition device 60 and a lane change control function unit 41. The lane change control function unit 41 is incorporated in the vehicle control device 40 as a functional block.

As shown in FIG. 7, the vehicle control device 40 includes a lane change control function unit 41 which outputs a control command to change a lane from a lane on which the host vehicle 100 is currently traveling to different lanes in response to the lane change request. The lane change control function unit 41 receives the lane marker information from the surrounding environment recognition device 60 and controls a dynamic behavior of the vehicle.

The lane change control function unit 41 includes a lane change request determination means 411, a target traveling direction line setting means 412, a moving body traveling direction line estimation means 413, a collision possibility determination means 414, and a control command calculation means 415. The control command from the control command calculation means 415 is transmitted to a vehicle behavior control device 42, thus a specific vehicle control is performed.

The lane change request determination means 411 determines whether there is a request to change a lane from a lane on which the host vehicle 100 is currently traveling to another lane based on a traveling plan of the host vehicle 100 which is determined by a driver's lane change operation (for example, winker operation or the like) or another function block of the vehicle control device 40. If it is determined that there is the lane change request by the lane change request means 411, the lane change request output is output to the target traveling direction setting means 412 and the moving body traveling direction estimation means 413.

The target traveling direction setting means 412 sets a target traveling direction line along which the host vehicle 100 travels at the time of changing a lane. The setting of the target traveling direction line may set the target traveling direction line from the traveling plan of the host vehicle 100. Specifically, as shown in FIG. 8, the target traveling direction in which the host vehicle 100 travels at the time of changing a lane can be represented by the point sequences 100-1, 100-2, 100-3, 100-4, and 100-5 at the position of the lane ahead of the host vehicle 100.

The moving body traveling direction line estimation means 413 acquires information regarding a relative position and a relative speed of a moving body 200 around the host vehicle 100 output from the surrounding environment recognition device 60 and the information regarding the lane L3 on which the moving body travels, and estimates the traveling direction line of the moving body. Specifically, as shown in FIG. 8, the moving body 200 continues to travel along the lane L3 on which the moving body 200 is currently traveling, and when the moving body 200 travels at the current relative speed, point sequences of a plurality of relative positions 200-1, 200-2, 200-3, 200-4, and 200-5 of the moving body 200 which arrives after a predetermined time elapses are output.

The collision possibility determination means 414 acquires the position point sequences 100-1, 100-2, 100-3, 100-4, and 100-5 of the target traveling direction line along which the host vehicle 100 travels from the target traveling direction line setting means 412 of the host vehicle at the time of changing a lane and acquires, from the moving body traveling direction line estimation means 413, the plurality of position point sequences 200-1, 200-2, 200-3, 200-4 and 200-5 of the moving body 200 which arrives after a predetermined time elapses, thereby determining the collision possibility based on the positions of the host vehicle 100 and the moving body 200 after a predetermined time elapses.

Specifically, when the positions of the host vehicle 100 and the moving body 200 exist within a predetermined distance at the same time after a predetermined time elapses, it is determined that the host vehicle 100 is highly likely to collide with the moving body 200, and when the host vehicle 100 is spaced apart from the moving body 200 larger than a predetermined distance, it is determined that the host vehicle 100 is less likely to collide with the moving body 200.

If the collision possibility determination means 414 determines that there is a possibility of collision, the control command calculation means 415 calculates a control command for avoiding a collision. The control command calculated by the control command calculation means 415 is output to the vehicle behavior control device 42 of the vehicle control device 40, and the vehicle behavior control device 42 computes a final command of the vehicle control device. In the present embodiment, the case of one moving body 200 has been described, but even in the case where there are the plurality of moving bodies, processing can be performed in the same way.

According to the embodiment shown in FIGS. 7 and 8, it is possible to determine even lanes on which the moving body 200 travels at the same time and accurately estimate the position of the surrounding moving body 200 after a predetermined time elapses, by recognizing the positions of the moving body 200 and the lane markers around the host vehicle 100. As a result, the host vehicle 100 equipped with the surrounding environment recognition device 60 can highly accurately determine the possibility of collision with the moving body 200 located around the host vehicle 100.

A representative example of the characteristic technologies of the embodiment described above will be described below.

(1) A road information recognition system includes a front lane marker detection means which detects a lane marker partitioning a lane on which a vehicle travels (hereinafter, referred to as a lane before change of lane), a side lane marker detection means which detects a lane marker adjacent to the lane before change of lane and partitioning a lane on which the vehicle travels after changing a lane (hereinafter, referred to as a lane after change of lane), and a lane width of the lane after change of lane, and a front lane marker estimation means which estimates, based on a common lane marker which partitions the lane before change of lane and the lane after change of lane (hereinafter, referred to as a lane marker on near side) detected by the front lane marker detection means, and the lane width of the lane after change of lane detected by the side lane marker detection means, a lane marker paired with the lane marker on a near side of the lane after change of lane (hereinafter, referred to as a lane on far side). (2) The road information recognition system includes a display means which displays the lane marker of the lane before change of lane detected by the front lane marker detection means and the lane marker on a far side of the lane after change of lane estimated by the front lane marker estimation means.

(3) The lane marker of the lane before change of lane and the lane marker of the lane after change of lane which are displayed on the display means are displayed in a point sequence.

(4) When the lane marker cannot be detected by the front lane marker detection means and the side lane marker detection means, the display means displays the lane marker which is not detected and the lane marker estimated by the lane marker which is not detected in a display form different from the detected lane marker and the lane marker estimated by the detected lane marker.

(5) When the lane marker on a near side of the lane before change of lane is not detected, the front lane marker estimation means estimates the lane marker on near side of the lane before change of lane, which is not detected, and the lane marker on a far side of the lane after change of lane based on a lane marker of an adjacent lane adjacent to the lane before change of lane on an opposite side of the lane after change of lane, and the lane width, and displays the estimated lane marker on near side and lane marker on far side on the display means.

(6) A road information recognition system includes a front lane marker detection means which detects a lane marker partitioning a lane on which a vehicle travels (hereinafter, referred to as a lane before change of lane), a side lane marker detection means which detects a lane marker adjacent to the lane before change of lane and partitioning a lane on which the vehicle travels after changing a lane (hereinafter, referred to as a lane after change of lane), and a lane width of the lane after change of lane, and a front lane marker estimation means which estimates a central line of the lane after change of lane based on a common lane marker which partitions the lane before change of lane and the lane after change of lane detected by the front lane marker detection means and the lane width of the lane after change of lane detected by the side lane marker detection means.

(7) The road information recognition system includes a display means which displays the central line of the lane after change of lane estimated by the front lane marker estimation means.

(8) The central line of the lane after change of lane which is displayed on the display means is displayed in a point sequence.

(9) The front lane marker detection means and the side lane marker detection means detect a "white line" drawn on a road.

(10) A vehicle control system includes a lane change control function unit which receives lane marker information from the road information recognition system having the characteristics of any one of the above (1) to (9) and controls a dynamic behavior of the vehicle based on the lane marker information.

(11) The vehicle control system detects a lane marker which partitions a lane on which the vehicle travels (hereinafter, referred to as a lane before change of lane), detects a lane marker which is adjacent to the lane before change of lane and partitions a lane on which the vehicle travels after changing a lane (hereinafter, referred to a lane after change of lane), and a lane width of the lane after change of lane, and estimates, based on a common lane marker which partitions the lane before change of lane and the lane after change of lane (hereinafter, referred to as a lane marker on near side) and the lane width of the lane after change of lane, a lane marker which is paired with the lane marker on a near side of the lane after change of lane (hereinafter, referred to as a lane on far side).

(12) The lane marker of the lane before change of lane and the estimated lane marker of the lane after change of lane are displayed on a display means.

(13) The lane marker of the lane before change of lane and the lane marker of the lane after change of lane is displayed in a point sequence.

(14) When the lane marker on near side is not detected, the lane marker on a near side of the lane before change of lane, which is not detected, and the lane marker on a far side of the lane after change of lane are estimated based on a lane marker of an adjacent lane adjacent to the lane before change of lane on an opposite side of the lane after change of lane, and the lane width.

(15) The vehicle control system detects a lane marker which partitions a lane on which the vehicle travels (hereinafter, referred to as a lane before change of lane), detects a lane marker which is adjacent to the lane before change of lane and partitions a lane on which the vehicle travels after changing a lane (hereinafter, referred to a lane after change of lane) and a lane width of the lane after change of lane, and estimates a central line of the lane after change of lane based on a common lane marker which partitions the lane before change of lane and the lane after change of lane, and the lane width of the lane after change of lane.

(16) The vehicle control system displays the estimated central line of the lane after change of lane.

(17) The lane marker is obtained by detecting a "white line" drawn on a road.

According to the present invention as described above, by imaging the surroundings of the vehicle, the lane marker of the lane after change of lane to be lane changed and the lane width of the lane after change of lane are detected, and the lane width of the lane after change of lane is reflected on the lane marker located on the near side of the lane after change of lane which is detected by imaging a front of the vehicle to estimate the lane marker to be located on the far side of the lane after change of lane.

According to the present invention, it is possible to estimate the lane marker to be located on the far side of the lane after change of lane based on the known lane marker located on the near side of the lane after change of lane and the lane width of the lane after change of lane. As a result, it is possible to improve the detection accuracy of the lane marker at the time of changing the lane and to improve the reliability of the road information recognition system.

The present invention is not limited to the above-described embodiments, but includes various modified examples. For example, the above-described embodiments have been described in detail in order to explain the present invention in an easy-to-understand manner, and are not necessarily limited to those having all the configurations described. Further, a part of the configuration of one embodiment can be replaced by the configuration of another embodiment, and the configuration of another embodiment can be added to the configuration of one embodiment

REFERENCE SIGNS LIST 10 motor
20 transmission
30 motor control device
40 vehicle control device
50 communication device
60 surrounding environment recognition device
80-1 image recognition device
80-2 image recognition device
80-3 image recognition device
80-4 image recognition device
90 braking device
100 vehicle, host vehicle
110 warning device
120 display device
130-1 right rear recognition device
130-2 left rear recognition device
130-3 right front recognition device
130-4 left front recognition device
610 front lane marker detection means
620 side lane marker detection means
640 front lane marker estimation means
650 lane marker output means
660 display device
670 notification means

The invention claimed is:

1. A road information recognition system, comprising:
a front lane marker detection means which detects a lane marker partitioning a lane on which a vehicle travels;
a side lane marker detection means which detects a lane marker adjacent to a lane before change of lane, which corresponds to the lane on which the vehicle travels, and partitioning a lane on which the vehicle travels after changing a lane, and a lane width of a lane after change of lane, which corresponds to the lane on which the vehicle travels after changing a lane; and
a front lane marker estimation means which estimates, based on a common lane marker which partitions the lane before change of lane and the lane after change of lane detected by the front lane marker detection means, and the lane width of the lane after change of lane detected by the side lane marker detection means, a lane marker paired with the lane marker on a near side of the lane after change of lane; and
a display means which displays a central line of the lane after change of lane estimated by the front lane marker estimation means, wherein
the lane marker of the lane before change of lane and the estimated lane marker of the lane after change of lane are displayed on the display means, and
the lane marker of the lane before change of lane and the lane marker on a far side of the lane after change of lane are displayed in different display forms.

2. The road information recognition system according to claim 1, comprising
the display means displays the lane marker of the lane before change of lane detected by the front lane marker detection means and the lane marker on a far side of the lane after change of lane estimated by the front lane marker estimation means.

3. The road information recognition system according to claim 1, wherein
when the lane marker on the near side of the lane before change of lane is not detected, the front lane marker estimation means estimates the lane marker on the near side of the lane before change of lane, which is not detected, and the lane marker on the far side of the lane after change of lane based on a lane marker of an adjacent lane adjacent to the lane before change of lane on an opposite side of the lane after change of lane, and the lane width, and displays the estimated lane marker on near side and lane marker on far side on the display means.

4. The road information recognition system according to claim 1, wherein
the front lane marker detection means and the side lane marker detection means detect a line that is painted on a road.

5. A road information recognition method, comprising:
detecting a lane marker which partitions a lane on which a vehicle travels;
detecting a lane marker which is adjacent to a lane before change of lane, which corresponds to the lane on which the vehicle travels, and partitions a lane on which the vehicle travels after changing a lane, and a lane width of a lane after change of lane, which corresponds to the lane on which the vehicle travels after changing the lane; and
estimating, based on a common lane marker which partitions the lane before change of lane and the lane after change of lane and the lane width of the lane after change of lane, a lane marker paired with the lane marker on a near side of the lane after change of lane;
displaying a display means which displays a central line of the lane after change of lane estimated by the front lane marker estimation means, wherein
the lane marker of the lane before change of lane and the estimated lane marker of the lane after change of lane are displayed on the display means, and
the lane marker of the lane before change of lane and the lane marker on a far side of the lane after change of lane are displayed in different display forms.

6. The road information recognition method according to claim 5, wherein
when a lane marker on near side, which corresponds to the common lane marker, is not detected, the lane marker on the near side of the lane before change of lane, which is not detected, and the lane marker on the far side of the lane after change of lane are estimated based on a lane marker of an adjacent lane adjacent to the lane before change of lane on an opposite side of the lane after change of lane. and the lane width.

\* \* \* \* \*